United States Patent [19]
Deister et al.

[11] Patent Number: 5,614,094
[45] Date of Patent: Mar. 25, 1997

[54] VIBRATING SCREEN UNIT

[75] Inventors: E. Mark Deister, Fort Wayne; Dale A. Loshe, New Haven, both of Ind.

[73] Assignee: Deister Machine Co., Inc., Fort Wayne, Ind.

[21] Appl. No.: 242,115

[22] Filed: May 13, 1994

[51] Int. Cl.$^6$ .......................... B01D 33/00; B01D 33/37; B07B 1/28
[52] U.S. Cl. .................. 210/388; 210/389; 210/324; 210/330; 210/391; 210/392; 210/393; 209/254; 209/250; 209/267; 209/269; 209/315; 209/316; 209/326; 209/366.5; 209/367; 209/409
[58] Field of Search ................................. 210/388, 389, 210/391, 392, 393, 324, 330; 209/269, 268, 267, 254, 315, 380, 250, 316, 326, 366, 366.5, 367, 409

[56] References Cited

U.S. PATENT DOCUMENTS

| | | |
|---|---|---|
| 256,315 | 4/1882 | Graves et al. . |
| 270,304 | 1/1883 | Graves . |
| 1,251,500 | 1/1918 | Geutes . |
| 2,048,923 | 7/1936 | Dodson . |
| 2,246,483 | 6/1941 | Dillon . |
| 2,298,182 | 10/1942 | Strube . |
| 2,408,558 | 10/1946 | Hutchinson . |
| 2,457,018 | 12/1948 | Wantling . |
| 2,537,878 | 1/1951 | Coon . |
| 2,588,088 | 3/1952 | Cover . |
| 2,592,605 | 4/1952 | Searles . |
| 2,682,338 | 6/1954 | Hurst . |
| 2,716,493 | 8/1955 | Hutchinson . |
| 2,903,135 | 9/1959 | Dryg . |
| 2,994,431 | 8/1961 | Becker et al. . |
| 3,077,266 | 2/1963 | Plumb . |

(List continued on next page.)

FOREIGN PATENT DOCUMENTS

| | | |
|---|---|---|
| 73457 | 9/1975 | Australia . |
| 704071 | 2/1965 | Canada . |
| 93278 | 11/1983 | European Pat. Off. . |
| 546585 | 6/1993 | European Pat. Off. . |
| 1300968 | 6/1962 | France . |
| 2351717 | 1/1978 | France . |
| 2924506 | 1/1981 | Germany . |
| 2923474 | 1/1981 | Germany . |
| 3109319 | 9/1982 | Germany . |
| 3324926 | 1/1985 | Germany . |
| 4-363182 | 12/1992 | Japan . |
| 6-292864 | 10/1994 | Japan . |
| 1553204 | 3/1990 | U.S.S.R. . |
| 1554990 | 4/1990 | U.S.S.R. . |
| 731012 | 6/1955 | United Kingdom . |
| 2123520 | 2/1984 | United Kingdom . |
| 2223778 | 4/1990 | United Kingdom . |
| 2237521 | 8/1991 | United Kingdom . |

OTHER PUBLICATIONS

Deister Machine Company, Inc. Bulletin No. 280, "Inclined and Horizontal Enclosed Vibrating Screens for Asphalt Plants".

Polydeck Screen Corporation Catalog; "New Breakthrough in Screening!"; Polydex® Doubledex.

Durex Products, Inc. Catalog; Dur–X–Snapdeck® Modular Screening Systems.

Diester Machine Company, Inc. Bulletin No. 310; "Heavy Duty Horizontal Vibrating Screens".

Rohr, 1989 Catalog, "Floating Grab Dredger".

Gesellschaft für Aufbereitungmaschinen GmbH + Co. KG Catalog Page; "Siebmaschinen".

Durex Products, Inc., One–page photocopy of Dur–X–Snapdeck® Modular Trough.

*Primary Examiner*—Thomas M. Lithgow
*Attorney, Agent, or Firm*—Barnes & Thornburg

[57] ABSTRACT

A vibrating screen unit for dewatering dredged material. The vibrating screen unit includes a frame and a top screen deck, a middle screen deck and a bottom screen deck. The middle screen deck includes a splitter which extends across the width of the frame and comprises alternating closed channels and screen rows which alternate across the width of the frame.

43 Claims, 4 Drawing Sheets

U.S. PATENT DOCUMENTS

| | | |
|---|---|---|
| 3,439,800 | 4/1969 | Tonjes . |
| 3,640,383 | 2/1972 | Wantling . |
| 3,666,095 | 5/1972 | Krynock . |
| 3,834,534 | 9/1974 | Peterson et al. . |
| 3,915,852 | 10/1975 | Butzow . |
| 3,970,552 | 7/1976 | Bougert . |
| 4,065,382 | 12/1977 | Derrick, Jr. . |
| 4,234,416 | 11/1980 | Lower . |
| 4,236,998 | 12/1980 | Heys . |
| 4,276,158 | 6/1981 | Görlitz . |
| 4,340,469 | 7/1982 | Archer . |
| 4,352,732 | 10/1982 | Massicotte . |
| 4,360,423 | 11/1982 | Fugate . |
| 4,576,713 | 3/1986 | Melin . |
| 4,632,751 | 12/1986 | Johnson et al. . |
| 4,826,017 | 5/1989 | Du Bourg . |
| 4,826,251 | 5/1989 | Balkus . |
| 4,882,054 | 11/1989 | Derrick et al. . |
| 4,911,834 | 3/1990 | Murphy . |
| 5,100,539 | 3/1992 | Tsutsumi . |
| 5,112,474 | 5/1992 | Douglas . |
| 5,141,650 | 8/1992 | Cavo . |

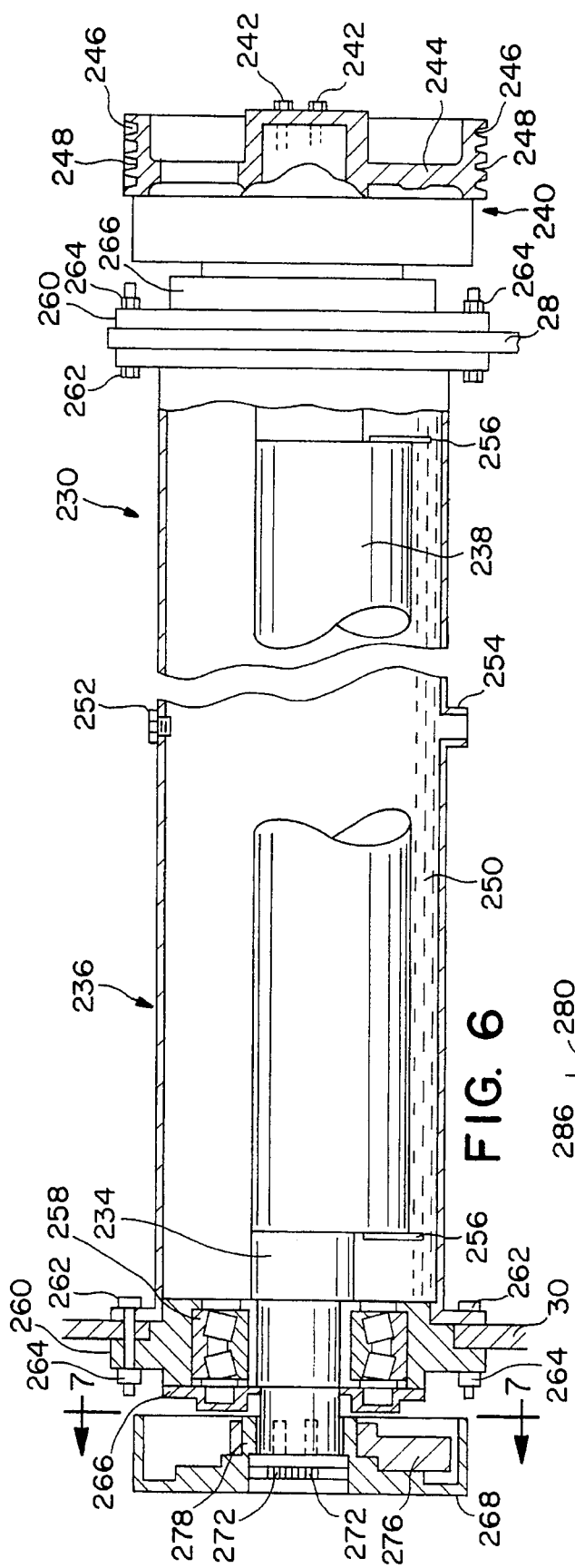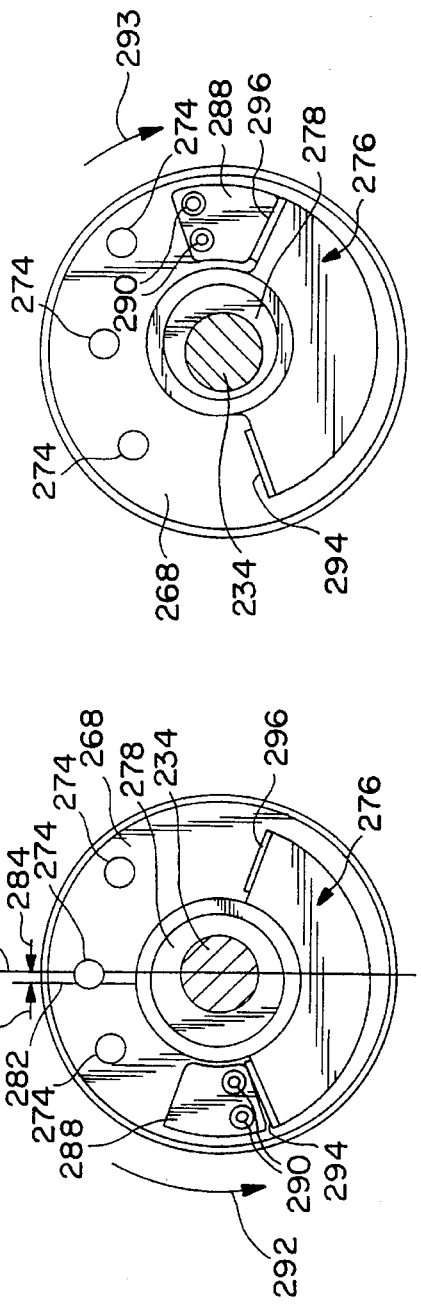

VIBRATING SCREEN UNIT

BACKGROUND AND SUMMARY OF THE INVENTION

The present invention relates to a unit for dewatering dredged material. More particularly the present invention relates to a vibrating screen unit for dewatering dredged material that can be used under unclean material conditions without reducing a feed rate to the machine used during clean material conditions.

Dredges dig and remove material, such as sand and gravel, from the bottom of bodies of water, such as lakes and quarries which have filled with water. The primary means for dewatering the dredged material is typically a vibrating screen unit having a deck surface covered by a screen mesh media that has a matrix of openings of a predetermined size and arrangement. Unlike conventional vibrating screen applications where material separation is achieved by having as much material as possible of a size less than that of the openings in the screen media fall below the screen deck surface, dewatering of the dredged material is achieved by retaining as much of the material above the size of the openings as possible on the screen deck surface while passing the water through the openings. During clean material conditions water and a small amount of fine grit pass through the openings in the screen mesh media while the dewatered material is discharged onto a conveyor belt for processing at a discharge end of the unit.

Dredges often encounter unclean material conditions where sludge, slime, and muck are retrieved along with desirable material. Sludge, slime, and muck do not easily pass through the openings in a screen mesh media of a vibrating screen unit. Therefore, most sludge, slime, and muck is discharged onto the conveyor belt along with the desirable material. Sludge, slime, and muck is semi-liquid and therefore does not move well on conveyor belts. The fluid nature of sludge, slime, and muck are particularly problematic when inclined conveyor belts are used because sludge, slime and muck tends to fall backwards, down an incline conveyor, where it collects and falls off. Over time, this sludge, slime, and muck accumulates and overflows back into the body of water from which it was retrieved. This results in it being brought up again by the dredge and reprocessed by the vibrating screen unit. In addition to this inefficient use of a dredge and vibrating screen unit, unclean material conditions make separation of sludge, slime, and muck from the sought after material, such as sand and gravel, difficult and more time consuming.

Current means available to handle unclean material involve a reduction in a feed rate of a vibrating screen unit to allow more time for the sludge, slime, and muck to be forced through the openings in the screen mesh media. Reduction of feed rate results in a reduced production rate for a dredging process to obtain clean material. A vibrating screen unit that solved the above problems associated witch unclean dredged material conditions without reducing the feed rate of the unit would be a welcome improvement.

Accordingly, the present invention includes a vibrating screen unit for dewatering dredged material. The vibrating screen unit includes a frame and a top screen deck that is coupled to the frame. The top screen deck has a first mesh size, a feed end that receives dredged material, and a discharge end that discharges substantially dewatered material of a size above the first mesh size. The vibrating screen unit also includes a middle screen deck coupled to the frame below the top screen deck that receives dredged material from the top screen deck. The middle screen deck has a second mesh size and a discharge end that discharges substantially dewatered material of a size above the second mesh size. The vibrating screen unit further includes a bottom screen neck coupled to the frame below the middle screen deck that receives dredged material from the top screen deck. The bottom screen deck has a third mesh size and a discharge end that discharges substantially dewatered material of a size above the third mesh size. A splitter of the vibrating screen unit is positioned to lie below the top screen deck to control the flow of material below the first mesh size to the middle and bottom screen decks. The splitter thus increases the screen deck surface area without increasing the floor space taken up by the unit. In preferred embodiments, the bottom and middle screen decks each have openings of a first size and the top screen deck has openings of a second size that are larger than the first size.

A carrying pan is positioned to lie below the middle screen deck and above the bottom screen deck to carry away water, grit, sludge, slime, and muck that passes through the openings of the top and middle screen decks. A "pant-leg" chute can be positioned to lie adjacent the discharge end of the middle screen deck to carry the contents of the carrying pan away from the unit. Water, grit, sludge, slime, and muck which passes through the openings in the bottom screen deck falls through the bottom of the unit.

In preferred embodiments, the top screen deck is angled in a range of between approximately five to seven degrees relative to a base of the frame such that the feed end of the top screen deck is above the discharge end of the top screen deck. In this preferred embodiment, the middle screen deck is also angled approximately 0.5 degrees relative to the base such that an end of the middle screen deck generally opposite the discharge end of the middle screen deck is above the discharge end of the middle screen deck. The bottom screen deck, however, remains generally parallel to the base.

Predetermined portions of the middle and bottom screen decks adjacent the discharge ends of these decks may be pivoted a predetermined number of degrees from in-line positions to vary the travel rates of material across these decks. In preferred embodiments, the predetermined number of degrees is approximately three degrees so that the middle and bottom screen decks can be pivoted through a total range of approximately six degrees. Pivoting the middle and bottom screen decks affects the rate at which material is conveyed across the middle and bottom screen decks which changes dewatering efficiency. For example, during unclean material conditions, the middle and bottom screen decks may be pivoted upward by up to approximately three degrees to slow down the flow rate of the dredged material in order to allow more water and impurities to fall through the openings in the decks.

The vibrating screen of the present invention includes a water treatment unit for clearing dredged material during unclean conditions. The water treatment unit is located on at least one screen deck. In preferred embodiments the water treatment unit includes one or more troughs that are located in one or more of the top, middle, and bottom screen decks. A spray bar is positioned to lie relative to each trough or row of troughs on a screen deck so that water from the spray bar is directed into the trough or a row of troughs to immerse the dredged material in churning water to help separate sludge, slime, and muck from the dredged material. The troughs may be integrated into a screen deck or may be fabricated as a separate component that is placed between sections of the screen deck. The troughs may be as deep as desired and, in preferred embodiments, extend from side to side of the frame of the unit in rows. The churning water helps cut up and liquify the sludge, slime, and muck so it falls through the openings in the screen deck under the influence of gravity more easily. When processing clean material, it is unnecessary to activate the spray bars. The troughs are preferably located towards the feed end of the unit to allow for a sufficient length of dewatering surface area on each screen deck after the material leaves the trough.

The vibrating screen unit includes a plurality of spring support assemblies that help to dampen vibration of the unit. Preferred embodiments of the unit, include four spring support assemblies, two positioned to lie below a feed chute of the frame and two positioned to lie adjacent the discharge end of the bottom screen deck. Incline adjustment pads may be located under each support spring assembly to allow for field adjustment of the incline of the entire unit by adding or removing pads from underneath either or both the spring support assemblies below the feed chute or the spring support assemblies adjacent the discharge end. The spring support assemblies each include a pivot trunnion assembly that allows the spring assembly to pivot when the incline of the unit is changed so that these assemblies remain substantially perpendicular with the support on which the unit rests. Chaning the incline of the unit changes the rate of travel of material through the unit.

The splitter includes a matrix of screen panels with a predetermined number of openings and solid panels that are both arranged in a pattern to control the quantity of material that passes to the bottom screen deck. Increasing the number of screen panels increases the amount of material that travels to the bottom screen deck whereas increasing the number of solid panels decreases the amount of material that travels to the bottom screen deck.

Flow dams may be positioned at various points on one or more of the screen decks. These dams extend generally perpendicularly from each deck, from side to side of the frame, so that they are transverse to the flow path of the material across the decks. The dams provide an obstacle which causes a small buildup of material on a screen deck surface which tends to compress the material thereby, forcing more water from it and enhancing the dewatering performance of the unit. These dams may be integrally cast or molded to the screen decks and may also be adjustable so that the height can be varied according to material conditions. In preferred embodiments, a dam is positioned at a predetermined location on the top screen deck adjacent the feed end of the top screen deck. The purpose of this dam is to cause as much material as possible of a size less than the openings of the top screen deck through these openings onto the splitter for division between the middle and bottom screen decks.

The vibrating screen unit includes a reversible counterweight that is coupled to a shaft counterweight of the unit to produce two different centrifugal forces based upon the direction of rotation and relative positions of the counterweights. During unclean material conditions, the reversible counterweight and shaft counterweight are rotated in a first direction where they are positioned relative to one another such that the mass of the counterweights add to produce a centrifugal force that causes the unit to vibrate with a particular amplitude. During clean material conditions, the direction of rotation of the counterweights is reversed so that the counterweights are positioned relative to one another such that the masses of the counterweights subtract to produce a smaller centrifugal force that causes the unit to vibrate with a smaller amplitude. Vibrating the unit with a larger amplitude increases material stratification on the top, middle, and bottom screen decks so that smaller material is forced towards the bottom of the beds of material on each of the decks. This forces a greater quantity of material below the first, second, and third mesh sizes through the respective top, middle, and bottom screen decks, thereby providing more opportunity for water and other impurities to be forced through the openings in these screen decks.

The frequency of vibration of the unit can be adjusted using any one of a number of means such as electronic variable frequency drives or hydraulic motors. Both examples provide a nearly infinite vibratory frequency range. Adjustment of the vibratory frequency along with changes in the vibratory amplitude allow for extensive adjustment of both unit speed and stroke to optimize those quantities for given material conditions.

In certain dredging operations where fine material such as sand is being retrieved, it is unnecessary for the vibrating screen unit to include a top screen deck. However, this embodiment of the vibrating screen unit includes the above-described structure, such as the splitter, water treatment unit, and carrying pan described above for the three screen deck embodiment of the unit. In this alternative embodiment of the unit, the two screen decks preferably have openings of a substantially equal size.

Other objects, advantages and novel features of the present invention will become apparent from the following detailed description of the invention when considered in conjunction with the accompanying drawings.

BRIEF DESCRIPTION OF THE DRAWINGS

FIG. 6 is an elevational view with portions broken away of a shaft assembly and reversible counterweight of the present invention.

FIG. 7 is a sectional view taken along line 7—7 of FIG. 6 showing the reversible counterweight of the present invention coupled to a shaft of the unit via an eccentric bearing hub both of which are rotating in a first direction.

FIG. 8 shows the reversible counterweight and shaft of FIG. 7 being rotated in a second direction generally opposite the direction of rotation shown in FIG. 7.

DETAILED DESCRIPTION OF THE DRAWINGS

Figure 1:
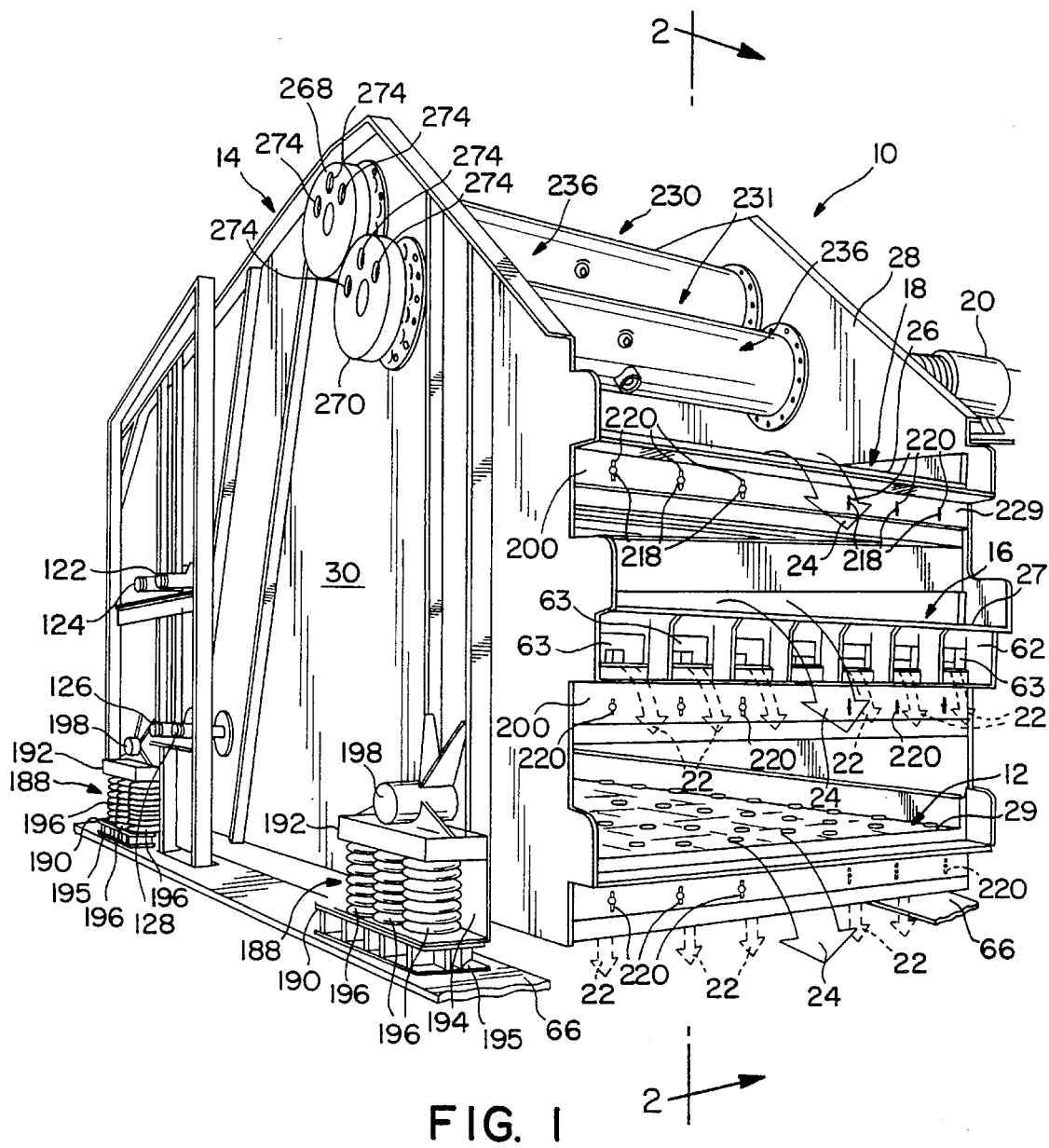
FIG. 1 is a perspective view of the vibrating screen unit of the present invention.

A vibrating screen unit 10 of the present invention for dewatering dredged material under both clean and unclean conditions is shown in FIG. 1. Unit 10 includes a bottom screen deck 12 that is coupled to a frame 14 of the unit. Unit 10 also includes a middle screen deck 16 coupled to frame 14 and positioned to lie above bottom screen deck 12. Unit 10 further includes a top screen deck 18 positioned to lie above middle screen deck 16 and coupled to frame 14. A pair of motors 20, only one of which is shown in FIG. 1, vibrates screen decks 12, 16, and 18 so that water and impurities such as sludge, slime, grit, and muck, generally indicated by dashed arrows 22 in FIG. 1, can be separated from desired material, such as sand and gravel, generally indicated by arrows 24, so that the material 24 exits unit 10 at discharge ends 26, 27, and 29 of respective bottom, middle, and top screen decks 12, 16, and 18 in a substantially clean and dewatered condition.

Vibrating screen unit 10 is designed to dewater both clean and unclean dredged material (i.e., material mixed with sludge, slime, and muck) without having to reduce a feed rate of the machine used during clean conditions. Currently, the feed rate of vibrating screen units must be reduced when sludge, slime, and muck is encountered during dredging, which reduces productivity. Applicant's invention does not require such reduction in feed rate during unclean material conditions.

Figure 2:
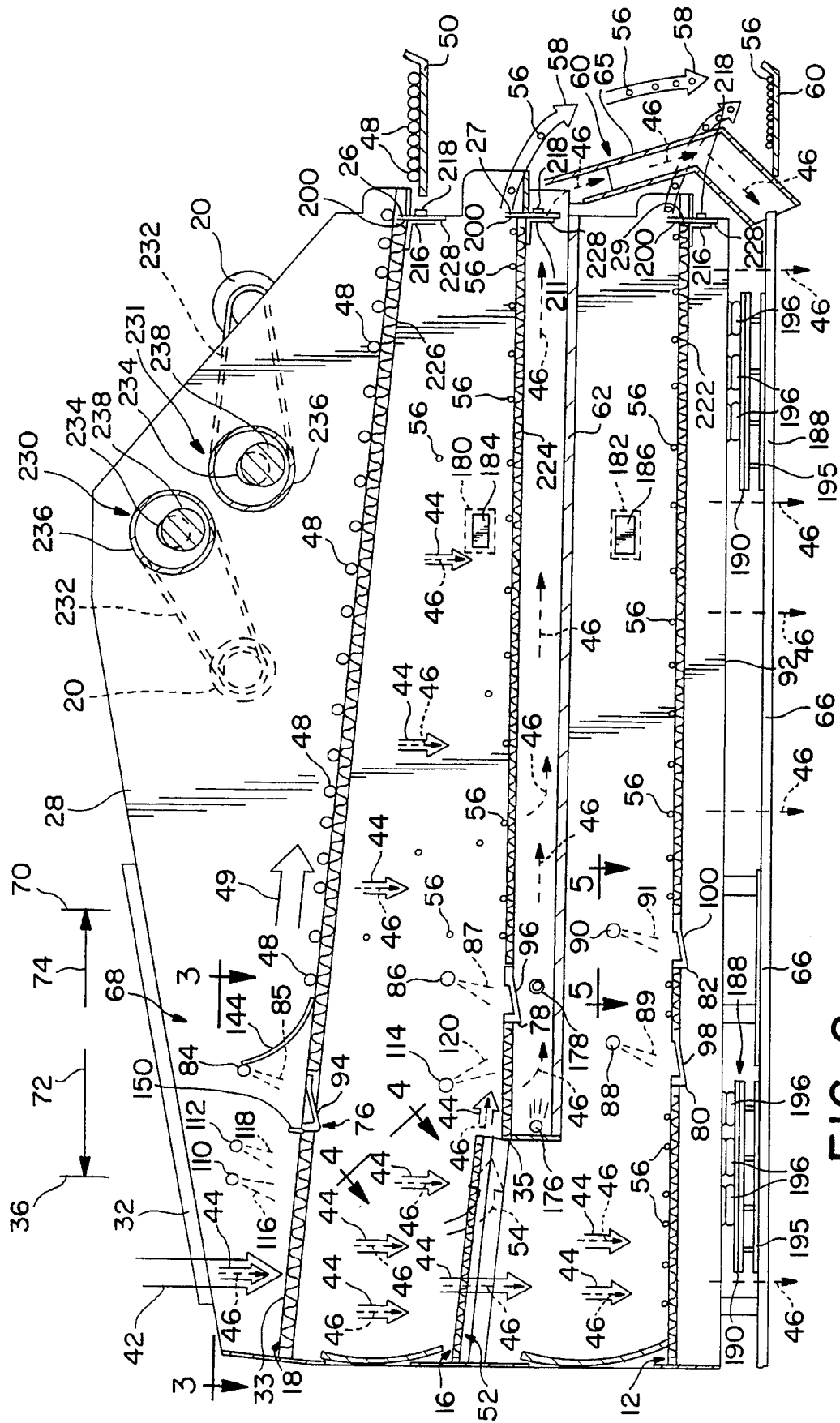
FIG. 2 shows a side elevational view of the vibrating screen unit taken along line 2—2 of FIG. 1.

FIG. 2 shows a side elevational view of unit 10 taken along line 2—2 in FIG. 1. Respective bottom, middle, and top screen decks 12, 16, and 18 area visible in this view as are motors 20, first side 28 of frame 14, which lies generally opposite second side 30 (see FIG. 1), and discharge ends 26, 27, and 29.

FIG. 2 further shows a feed chute 32 of unit 10 into which dredged material is introduced for processing. The contents of dredged material are generally indicated by large open arrow 42, which represents a material of a first size, smaller open arrow 44, which represents a material of a second size smaller than the first size, and dashed arrow 46, which represents water and impurities such as sludge, slime, grit, and muck. As can be seen in FIG. 2, dredged material introduced into unit 10 via feed chute 32 first contacts feed end 33 of top screen deck 18. Top screen deck 18 separates material represented by large open arrow 42 from material represented by smaller open arrow 44 and material and water represented by dashed arrow 46. The material remaining on the top screen deck 18, represented by large ovals 48, moves along top screen deck 18 in the direction generally indicated by large open arrow 49 where it is discharged at discharge end 26 onto a conveyor 50 for collection and subsequent transport. As more fully discussed below, top screen deck 18 is formed to include a plurality of openings of predetermined size that are arranged in a predetermined pattern to prevent material above the size of these openings from falling through top screen deck 18. This material, represented in FIG. 2 by large ovals 48, flows onto conveyor 50. Material of a size smaller than the openings in top screen deck 18 falls, under the influence of gravity, towards middle screen deck 16, which is illustrated in FIG. 2 by having only smaller open arrow 44 and dashed arrow 46 shown below top screen deck 18. Material represented by smaller open arrow 44 and material and water represented by dashed arrow 46 in the vicinity of feed chute 32 next comes in contact with splitter 52 of unit 10. Splitter 52 divides the quantity of material and water represented by arrows 44 and 46 between respective middle and bottom screen decks 16 and 12. Splitter 52, as more fully discussed below, accomplishes this by allowing a portion of the material and water represented by arrows 44 and 46 to pass through to bottom screen deck 12 while preventing another portion of the material and water represented by arrows 44 and 46 from passing through to bottom deck 12 and, instead, directing this material and water onto middle screen deck 16 as generally shown by curved large open arrow 54.

Middle screen deck 16, as more fully discussed below, is formed to include a plurality of openings of a predetermined size that are arranged in a predetermined pattern to prevent material of a size larger than these openings, represented in FIG. 2 by small ovals 56, from passing through while allowing material and water represented by dashed arrow 46 to pass through. As shown in FIG. 2, material 56 travels along middle screen deck 16 to discharge end 27 where it falls, under the influence of gravity, as generally indicated by open arrow 58 onto a conveyor 60 for collection and subsequent transport Middle screen deck 16 also processes material 44 and material and water 46 which passes through top screen deck 18 away from feed chute 32. Bottom screen deck 12, however, does not process any of the dredged material from top screen deck 18 other than that portion of the dredged material from top screen deck 18 that is directed to bottom screen deck 12 by splitter 52. This is generally indicated in FIG. 2 by the presence of arrows 44 and 46 only between splitter 52 and bottom screen deck 12.

Bottom screen deck 12 is also formed to include a plurality of openings of predetermined size and arranged in a predetermined pattern which prevent material above the opening size from passing through while allowing material below the opening size to pass through. In the preferred embodiment shown in FIG. 2, the openings formed in respective middle and bottom screen decks 16 and 12 are substantially equal so that material of generally the same size represented by small ovals 56 is retained on bottom screen deck 12 while material and water represented by dashed arrows 46 falls through bottom screen deck 12 and out of bottom 92 of unit 10.

Material and water represented by dashed arrow 46 that falls through middle screen deck 16 is collected by a carrying pan 62 which is positioned to lie below middle screen deck 16 along that portion of the length of middle screen deck 16 which extends adjacent splitter 52 to discharge end 27 of middle screen deck 16. Material and water represented by dashed arrow 46 collected by carrying pan 62 flows toward discharge end 27 of middle screen deck 16 where it is collected and directed away from unit 10 via pant-leg chute 64 which is positioned to lie adjacent discharge end 27 as shown. Pant-leg chute 64 is removed from the illustration of unit 10 in FIG. 1 for clarity. However, as can be seen in FIG. 1, carrying pan 62, adjacent discharge end 27, is formed to include a plurality of openings 63 through which water, sludge, slime, grit, and muck 22 flows into pant-leg chute 64. Although not shown, it can be appreciated from the combination of FIGS. 1 and 2 that pant-leg chute 64 includes a plurality of downwardly extending, spaced-apart pipes 65, one of which is shown in FIG. 2, that connect to carrying pan 62 adjacent openings 63 therein. It is necessary to form pant-leg chute 64 from a plurality of downwardly extending, spaced apart pipes 65 to provide room for clean material 24 to exit from discharge end 29 of bottom screen deck 12.

Dredged material introduced into unit 10 at feed chute 32 moves through unit 10 and is discharged from screen decks 12, 16, and 18, at respective ends 29, 27, and 26, by vibrating unit 10 via motors 20 as more fully discussed below. In addition, one or more of respective bottom middle and top screen decks 12, 16 and 18 may be angled to facilitate movement of dredged material through unit 10. In the preferred embodiment shown in FIG. 2, top screen deck 18 is angled from feed end 33 to discharge end 26, in a range of between approximately five to seven degrees, relative to base 66 of frame 14. In addition, as shown in the preferred embodiment of FIG. 2, middle screen deck 16 is also angled from end 35 to discharge end 27 by approximately 0.5 degrees relative to base 66. In the preferred embodiment shown in FIG. 2, bottom screen deck 12 is generally parallel to base 66.

Vibrating screen unit 10 includes a water treatment unit 68 having boundaries generally indicated by lines 36 and 70 as well as arrows 72 and 74. Water treatment unit 68 is activated when unclean material conditions are encountered. Water treatment unit 68 helps clean dredged material by separating undesirable sludge, slime and muck from material, such as sand and gravel, during these unclean conditions. Activation of water treatment unit 68 is unnecessary during clean material conditions.

Water treatment unit 68 is shown in the preferred embodiment of unit 10 in FIG. 2 as including a plurality of troughs 76, 78, 80 and 82 in respective bottom, middle and top screens 12 16 and 18. Troughs 76 78, 80 and 82 can be as deep as desired and extend in rows from first side 28 to second side 30 of frame 14. Troughs 76, 78, 80 and 82 may each be constructed from a single structure that extends from first side 28 to second side 30 or may each be constructed from a plurality of separate structures placed side by side.

Overhead spray bars 84, 86, 88, and 90 are positioned to lie above respective troughs 76, 78, 80, and 82. Overhead spray bars 84, 86, 88 and 90 spray high pressure sheets of water 85, 87, 89, and 91 into respective troughs 76, 78, 80, and 82 to immerse unclean dredged material in churning water. Sludge, slime and muck is cut up and liquified by this churning water and subsequently passes through the openings in respective bottom, middle, and top screen decks 12, 16, and 18 under the influence of gravity, as depicted by dashed arrows 46 in FIG. 2.

Troughs 76, 78, 80, and 82 are preferably formed to have a cross section that prevents dredged material from collecting over time and clogging. This is accomplished by forming troughs 76, 78, 80, and 82 to include respective angled sides 94, 96, 98, and 100.

As shown in FIG. 2, water treatment unit 68 of unit 10 also includes additional overhead spray bars 110, 112, and 114 positioned to lie above respective middle and top screen decks 16 and 18. Overhead spray bars 110, 112 and 114 also spray high pressure sheets of water 116, 118, and 120, in the direction shown, onto dredged material during unclean conditions. Overhead spray bars 110, 112 and 114 are positioned in the flow path of the dredged material before troughs 76 and 78 to prewash the unclean material. As can be seen in the preferred embodiment of FIG. 2, troughs 76, 78, 80, and 82 as well as overhead spray bars 84, 86, 88, 90, 110, 112, and 114 are located towards feed chute 32 of unit 10 to leave sufficient surface area on screen decks 12, 16, and 18 for dewatering.

Water is supplied to overhead spray bars 86 and 114 via respective pipe fittings 122 and 124 which are connected to bars 86 and 110 and which extend outward of second side 30 of unit 10 as shown in FIG. 1. Hoses (not shown) attach to pipe fittings 122 and 124. Similar pipe fittings 126 and 128 provide high pressure water to respective overhead spray bars 88 and 90 via hoses (not shown) which attach to pipe fittings 126 and 128. Although not shown, other pipe fittings supply high pressure water to overhead spray bars 84, 110, and 112.

Figure 3:
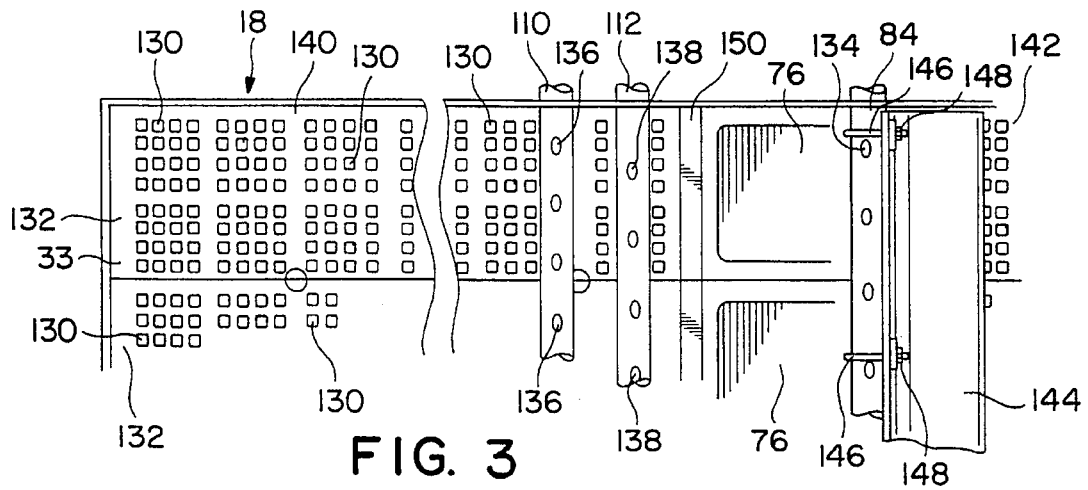
FIG. 3 is a partial plan view taken along line 3—3 of FIG. 2 showing the top screen deck, troughs, overhead spray bars, and a curtain adjacent a feed end of the unit.

A partial plan view of top Screen deck 18, troughs 76 and overhead spray bars 84, 110 and 112 is shown in FIG. 3. As discussed above, top screen deck 18 is formed to include a plurality of openings 130 of a predetermined size and arranged in a predetermined pattern to separate dredged material and prevent material larger than the size of openings 130 from passing below top screen deck 18. In the preferred embodiment shown, top screen deck 18 is formed from a plurality of rectangular panels 132 which are positioned adjacent one another. These panels may be purchased from manufacturers such as Durex Products, Incorporated. Overhead spray bars 84, 110 and 112 each include a plurality of respective nozzles 134, 136, and 138 through which high pressure water passes. Nozzles 134, 136, and 138 of overhead spray bars 84, 110, and 112 direct the high pressure water provided via pipe fittings (not shown) to form sheets 85, 116, and 118.

Troughs 76 are shown as a separate component that is placed between respective first and second sections 140 and 142 of top screen deck 18. Troughs 76 can be relocated along top screen deck 18 by removing them and panels 132 from support tracks (not shown in FIG. 3) on which both are mounted and placing troughs 76 at the locations previously occupied by the removed panels 132 and placing the removed panels 132 at the locations previously occupied by the troughs 76. In addition, troughs 76 can be removed altogether and replaced with panels 132. Finally, additional troughs may be added by removing one or more panels 132 from the support tracks (not shown) and placing troughs 76 in these locations. It should be noted that troughs 76 do not have to be removable. That is, troughs 76 can be integrated into top screen deck 18.

A flexible curtain 144 is coupled to overhead spray bar 84 via a plurality of fasteners 146 and locknuts 148. In preferred embodiments, flexible curtain 144 extends between first side 28 and second side 30 of frame 14. Flexible curtain 144 helps retain dredged material on screen deck 18 in the vicinity of feed end 33 and water treatment unit 68 so that material of a size less than the size of openings 130 falls through top screen deck 18 onto splitter 52 and middle screen deck 16. Curtain 144 preferably is made from a elastomeric material that is both flexible and resistant to abrasion such as rubber.

A flow dam 150 is positioned ion top screen deck 18 between troughs 76 and panels 132. As shown in FIG. 2, flow dam 150 extends generally perpendicularly from screen deck 18. Flow dam 150 also traverses screen deck 18 from first side 28 to second side 30. Flow dam 150 provides an obstacle to the flow of dredge material represented by lines 42, 44 and 46 along top screen deck 18 which causes a build-up of this material that tends to compress it and force material below the size of openings 130 as well as water through top screen deck 18 onto splitter 52. Flow dam 150 thus functions to reduce the amount of separation that must be performed by the remainder of top screen deck 18 downstream of flow dam 150 by directing more material of a size smaller than openings 130 and water onto splitter 52 where it is processed by respective bottom and middle screen decks 12 and 16.

Figure 4:
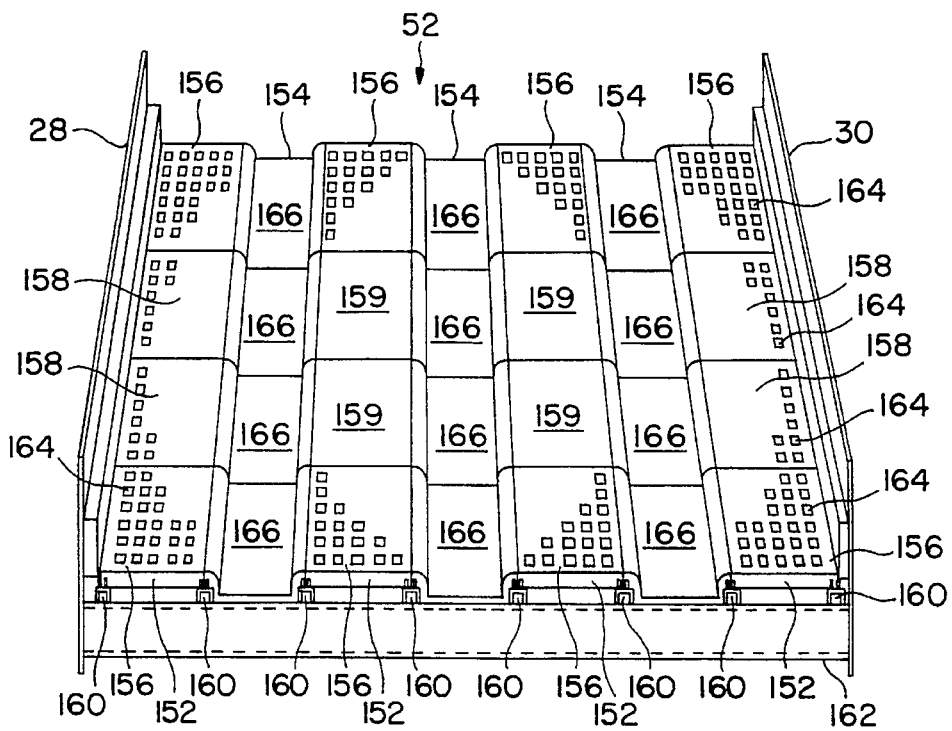
FIG. 4 is a perspective view taken along line 4—4 of FIG. 2 showing a splitter of the vibrating screen unit of the present invention.

A perspective view of splitter 52 taken along line 4—4 of FIG. 2 is shown in FIG. 4 is can be seen from FIG. 4, splitter 52 extends from first side 28 to second side 30 of unit 10. Splitter 52 includes a plurality of alternating screen rows 152 and closed channel rows 154. Each of screen rows 152 is formed from a plurality of panels 156, 158, and 159 that attach to tracks 160 which run the length of and which are attached to splitter base 162. Panels 156 and 158 are each formed to include a plurality of openings 164 of a predetermined size that are arranged in a predetermined pattern. As can be seen in FIG. 4, panels 156 are formed to include a greater number of openings 164 than panel 158. Solid panels 159 have no openings. The number and arrangement of panels 156, 158, and 159 can be changed depending upon the quantity of material to be directed to bottom screen deck 12. The greater the number of openings 164, the more material directed to bottom screen deck 12. In addition, panels other than 156 and 158 having a larger or smaller number of openings 164 can be used to control the amount of material that is divided between respective bottom and middle screen decks 12 and 16. Furthermore, the number of solid panels 159 can be increased or decreased to control the amount of material that is divided between respective bottom and middle screen decks 12 and 16.

Closed channel rows 154 are formed from a plurality of panels 166 that are formed to couple to tracks 160 along with panels 156, 158, and 159 as described above. As can be seen panels 166 are placed side by side to form channel rows 154 that run the length of splitter 52. Recessed channel rows 154 have no openings formed therein so that material and water falling from top screen deck 18 onto rows 154 flows directly onto middle screen deck 16. As with panels 156, 158, and 159, the number and arrangement of panels 166 can be changed. Thus, any matrix of openings 164 can be created for splitter 52 through the use of panels, such as panels 156, 158, 159, and 166, to control the division of dredged material between respective bottom and middle screen decks 12 and 16.

Figure 5:
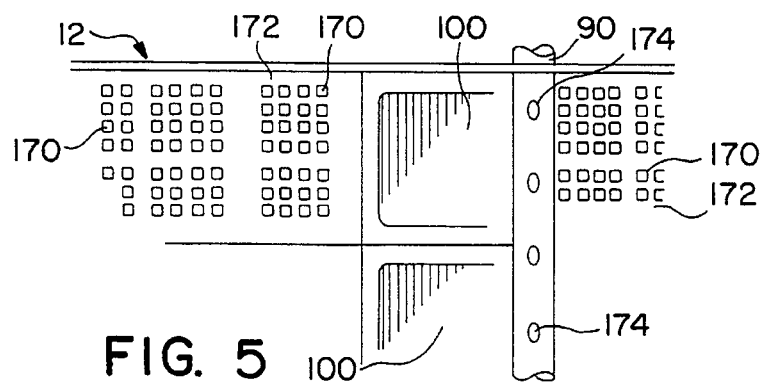
FIG. 5 is a partial plan view taken along line 5—5 in FIG. 2 showing a bottom screen neck, troughs, and an overhead spray bar of the vibrating screen unit.

A partial plan view of bottom screen deck 12 adjacent water treatment unit 68 of unit 10 taken along line 5—5 of FIG. 2 is shown in FIG. 5. As can be seen in FIG. 5, bottom screen deck 12 is formed to include a plurality of openings 170 of a predetermined size that are arranged in a predetermined pattern. As with top screen deck 18, bottom screen deck 12 is formed from a plurality of panels 172 that are coupled to tracks (not shown) which run the length of top screen deck 18. As with panels 132, panels 172 may be purchased front manufacturers such as Durex Products, Incorporated. Troughs 100 of unit 10 are shown in FIG. 5 as being positioned between sections of panels 172. In other embodiments troughs 100 may be integrally molded into bottom screen deck 12. In the preferred embodiment shown in FIG. 5, the location of troughs 100 may be changed by placing them in positions occupied by panels 172 as discussed above in connection with movement of troughs 76 and panels 132. Alternatively, troughs 100 may be completely removed and the open sections in bottom screen deck 12 replaced with panels 172.

The position of overhead spray bar 90 above and adjacent troughs 100 is also shown in FIG. 5. Overhead spray bar 90 is formed to include a plurality of nozzles 174 arranged substantially in-line with one another. Nozzles 174 of overhead spray bar 90 direct the high pressure water provided via pipe fitting 126 to form sheet 91 described above.

As discussed above, unit 10 includes a carrying pan 62 positioned to lie below middle screen deck 16 to catch material indicated by dashed line 46 which falls through the openings in deck 16. Carrying pan 46 collects and directs material and water 46 to pant-leg chute 64 which conveys material 46 away from unit 10 as shown. Over time carrying pan 62 may become clogged and need to be cleaned out. Water inlet 176 formed in first side 28 of unit 10 allows a high-pressure stream of water to be introduced into carrying pan 62 to allow it to be flushed out when necessary. A water inlet similar to inlet 176 may be provided in second side 30.

Depending upon the feed rate for unit 10, carrying pan 62 may also reach maximum carrying capacity during operation. If this occurs, middle screen deck 16 will no longer be able to dewater dredged material generally indicated by ovals 56. To alleviate this problem, a relief valve 178 is provided in first side 28 of unit 10 to allow material and water 46 to drain from carrying pan 62 as necessary. A relief valve similar to relief valve 178 may be formed in second side 30 of unit 10 to also allow for run off of excess material and water 46 from carrying pan 62.

As can be seen in FIG. 2, first side 28 of vibrating screen unit 10 is formed to include access windows 180 and 182. Access windows 180 and 182 allow the interiors of unit 10 in the vicinity of the area between top screen deck 18 and middle screen deck 16 as well as between middle screen deck 16 and bottom screen deck 12 to be viewed. Covers 184 and 186 are placed over access windows 180 and 182 when not in use so that dredged material will not inadvertently fall from unit 10. The number and positioning of access windows 180 and 182 can be changed. For example, an access window could be formed in second wall 30 of unit 10 between splitter 52 and bottom screen deck 12.

Unit 10 includes a plurality of stabilizing spring mount assemblies 188 coupled between base 66 and first and second sides 28 and 30 as shown in FIG. 1. Each spring mount assembly 188 includes a horizontal plate 190, a support plate 192 positioned above and substantially co-planer with horizontal plate 190, and an elastomeric certain 194 coupling horizontal plate 190 and support plate 192 together. A plurality of heavy coil springs 196 are coupled between horizontal plate 190 and support plate 192. Spring mount assemblies 188 help dampen the movement of unit 10 during vibration. Elastomeric curtains 194 normally extend around all sides of plates 190 and 192 so that springs 196 are obscured from view. Curtains 194 thus enclose springs 194 to protect them from dredged material and water. As can be seen from the combination of FIGS. 1 and 2, the preferred embodiment of unit 10, includes four spring mount assemblies 188, two generally Below feed chute 32 and two adjacent discharge end 29 of bottom screen deck 12 so that assemblies 188 are adjacent four different corners of base 66.

The angle of vibrating screen unit 10 can be changed via the use of inclined adjustment pads 195. These pads are placed under two or four of the spring mount assemblies 188 to adjust the incline of the unit. Adjusting the incline of unit 10 changes the rate of travel of dredged material across respective bottom, middle and top screen decks 12, 16 and 18. For example, increasing the number of incline adjustment pads 195 under assemblies 188 generally below feed chute 33, without adding additional pads 195 under assemblies 188 adjacent discharge end 29, speeds up the rate of travel of dredged material across respective bottom, middle, and top screen decks 12, 16, and 18.

Pivot trunnion assemblies 198 are located between spring mount assemblies 188 and first and second sides 28 and 30. Each pivot trunnion assembly 198 is coupled to a support plate 192 and one of either first or second sides 28 and 30 of frame 14. Pivot trunnion assemblies 198 allow the spring mount assemblies 188 to pivot when the incline of unit 10 is changed so that these assemblies remain substantially perpendicular with base 66.

In preferred embodiments, portions of both respective bottom and middle screen decks 12 and 16 adjacent respective discharge ends 29 and 27 of these decks are pivotable up or down by approximately three degress from an in-line position. Pivoting these portions of respeative bottom and middle screen decks 12 and 16 allows the travel rate of dredged material in this section to be changed for more efficient dewatering depending upon existing material conditions. For example, when unclean material conditions are encountered, the angle of both respective bottom and middle screen decks 12 and 16 can be changed three degrees upward from normal in-line positions to increase the amount of time that it takes for dredged material to pass across these decks. This allows greater quantities of unwanted material and water to be removed from a desired material.

In addition to flow dam 150, the preferred embodiment of unit 10 includes weir plates 200 coupled to ends 29, 27, and 26 of respective bottom, middle and top screen decks 12, 16, and 18 as shown in FIGS. 1 and 2. Weir plates 200 are coupled to ends 29, 27, and 26 by brackets 216 and fasteners 218 disposed in slots 220 formed through plates 200. Brackets 216 are connected to bottom surfaces 222, 224 and 226 of respective bottom, middle and top screen decks 12, 16, and 18 and a first side 228 of each of weir plate 200. The height of weir plates 200 can be adjusted through a range of multiple positions above decks 12, 16, and 18, from a lowered position flush or below decks 12, 16, and 18, to cause a small build-up of material on respective bottom, middle and top screen decks 12, 16, and 18 adjacent respective discharge ends 29, 27, and 26. This build-up compresses material on the surfaces of these decks to force additional water, sludge, slime, grit, and muck through the openings in these decks thereby enhancing dewatering performance. Weir plates 200 are preferably made from steel or urethane.

As discussed above, motors 20 provide power to vibrate screen unit 10. As can be seen in FIG. 2, one motor 20 is coupled to shaft assembly 230 by drive belt 232 and the other motor 20 is coupled to shaft assembly 231 by another drive belt 232. Shaft assemblies 230 and 231 each include a shaft 234 enclosed within a shaft housing 236. A shaft counterweight 238 is coupled to each shaft 234. As can be seen in FIG. 2, each shaft counterweight 238 is eccentrically coupled to shaft 234 so that when shaft 234 is rotated via driving engagement with motor 20, a centrifugal force is created which causes unit 10 to vibrate with an amplitude. The amplitude of this vibration depends upon such factors as the amount of eccentricity between shaft 234 and counterweight 238 and the mass of counterweight 238.

FIG. 6 is an elevational view of shaft assembly 230 shown in FIGS. 1 and 2 with selected portions broken away. Although not shown in FIG. 6, it is to be understood that shaft assembly 231 has the same components as shaft assembly 230, unless otherwise noted. Shaft assembly 230 includes a drive portion 240 that is coupled to shaft 234 via fasteners 242. Drive portion 240 includes a drive wheel 244 and a rim 246 which is formed to include a plurality of channels 248 into which portions of drive belt 232 are positioned to lie to secure drive belt 232 to rim 246 of drive wheel 244. Oil 250 is placed within shaft housing 236 via an opening that is closed via plug 252. Shaft housing 236 is also formed to include a drain plug 254, shown in FIG. 6 as being open, through which oil 250 can be removed. During operation of unit 10, drain plug 254 is closed. Oil flingers 256 are coupled to shaft counterweight 238 and throw oil 250 onto spherical roller bearings 258 when shaft 230 and shaft counterweight 238 are rotated by drive belt 232 and motor 20. Spherical roller bearings 258 must be kept oiled when unit 10 is in operation to reduce friction and heat build-up. Spherical bearings 258 are located at both ends of shaft 230 in bearing housings 260 which are mounted to shaft housing 236 and first and second sides 28 and 30 of frame 14 by fasteners 262 and locknuts 264 as shown. Access to spherical roller bearings 258 is via covers 266.

External counterweights 268 and 270, shown in FIG. 1, are coupled to shaft 234 via fasteners, such as fasteners 272 shown in FIG. 6 for external counterweight 268. External counterweights 268 and 270 provide a means for adjusting the amplitude of vibration of unit 10 without having to disassemble a shaft assembly 230 to gain access to shaft counterweights 238. As can be seen in FIG. 1, a plurality of apertures 274 are formed in both external counterweights 268 and 270. Apertures 274 reduce the mass of external counterweights 268 and 270 to provide an additional means of adjusting the amplitude of vibration of unit 10. The number and positioning of apertures 274 can be varied according to the needed amplitude.

In order to change the amplitude of vibration of unit 10, either one or both of external counterweights 268 and 270 must be removed and modified or one or both of shaft counterweights 238 removed and replaced or modified. Such procedures are time consuming. This is particularly problematic for vibrating screen units that encounter both clean and unclean material conditions. As discussed above, current machines require that the feed rate be reduced during unclean material conditions in order for sufficient dewatering to occur.

Reversible counterweight 276 coupled to shaft 234 via eccentric bearing hub 278 addresses this problem by producing, in combination with eccentric counterweight 268 and shaft counterweight 238, two different vibratory amplitudes for unit 10 depending upon the direction of rotation of reversible counterweight 276. Although not shown, a similar reversible counterweight 276 is also coupled to eccentric counterweight 270.

As can be seen in the sectional view of FIG. 7, reversible counterweight 276 is eccentrically mounted to shaft 234 via eccentric bearing hub 278. This eccentric mounting is generally indicated by line 280 which generally passes through the center of shaft 234, line 282 which generally passes through the center of eccentric bearing hub 278 and arrows 284 and 286 which indicate the amount of offset between these centers. A stop block 288 is coupled to external counterweight 268 via fasteners 290. When shaft 234 is rotated in a counterclockwise direction generally indicated by arrow 292, stop block 288 strikes first impact end 294 of reversible counterweight 276 to rotate reversible counterweight 276 in the counterclockwise direction. Although not shown, when shaft 234 is rotated in the counterclockwise direction generally indicated by arrow 292, both reversible counterweight 276 and shaft counterweight 238 are on the same side of shaft 234. Because reversible counterweight 276 and shaft counterweight 238 are on the same side of shaft 234, their masses add to produce a larger centrifugal force and vibratory amplitude than otherwise normally occurs with only shaft counterweight 238 and external counterweight 268. This larger amplitude is used during unclean material conditions to increase stratification of material on top, middle, and bottom screen decks 18, 16, and 12 so that a greater quantity of material below the opening sizes of each of these decks goes to the bottom of the bed of material on each of the screen decks where it ms mare likely to pass through the openings in these decks. This larger amplitude is particularly useful as the depth of the material bed on the screen decks increases.

Reversible counterweight 276 also includes a second impact end 296 which stop block 288 strikes when the direction of shaft 234 is reversed to the clockwise direction generally indicated by arrow 293 in FIG. 8. Upon impact between stop block 288 and second impact end 296, reversible counterweight 276 begins to also rotate in the clockwise direction. Although not shown, when shaft 234 is rotated in the clockwise direction, shaft counterweight 238 and reversible counterweight 276 lie on opposite sides of shaft 234. When reversible counterweight 276 and shaft counterweight 238 lie on opposite sides of shaft 234, their masses oppose one another to produce a smaller centrifugal force and vibratory amplitude for screen unit 10. This smaller amplitude is used during clean material conditions.

The frequency of vibration of screen unit 10 can be also adjusted in addition to the above-described adjustment of the vibratory amplitude of unit 10. Adjusting the frequency of vibration of screen unit 10 affects the dewatering efficiency in such a way that the slower the frequency of vibration the more time material has to be conveyed across respective top, middle and bottom screen decks 18, 16, and 12. An adjustable frequency can be achieved in any one of a number of manners such as an electronic variable frequency drive. Varying the frequency of vibration in combination with varying the amplitude of vibration allows for extensive adjustment of the material flow rate across the screen decks of the unit. A particular combination of speed and amplitude can be chosen which works best with a given material condition.

In certain dredging operations where fine material such as sand is being retrieved, it is unnecessary for vibrating screen unit 10 to include top screen deck 18. However, this embodiment of vibrating screen unit 10 includes the above-described structure, such as splitter 52, water treatment unit 68, and carrying pan 62 described above for the three screen deck embodiment of unit 10. In this alternative embodiment of unit 10, the two screen decks preferably have openings of a substantially equal size.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A screen unit for dewatering material under clean and unclean conditions, comprising:
   a frame having a width;
   a top screen deck coupled to the frame and having a first mesh size, a feed end to receive material, and a discharge end that discharges substantially dewatered material of a size above the first mesh size;
   a middle screen deck coupled to the frame below the top screen deck and having a second mesh size and a discharge end that discharges substantially dewatered material of a size above the second mesh size;
   a bottom screen deck coupled to the frame below the middle screen deck and having a third mesh size and a discharge end that discharges substantially dewatered material of a size above the third mesh size;
   a splitter positioned to lie below the top screen deck for dividing flow of material below the first mesh size between the middle and bottom screen decks, said splitter extending continuously across the width of said frame and comprising alternating closed channels and screen rows which alternate across the width of the frame; and
   a water treatment unit coupled to the frame and at least one of the three decks that cleans the material during unclean material conditions.

2. The screen unit of claim 1, wherein the second and third mesh sizes are substantially equal.

3. The screen unit of claim 1, wherein the splitter is positioned to lie below the feed end of the top screen deck.

4. The screen unit of claim 1, further comprising a pan positioned to lie below the middle screen deck and above the bottom screen deck to carry away water and material that passes through the middle screen deck.

5. The screen unit of claim 1, wherein the frame includes a base, the top screen deck is angled in a range of between approximately five to seven degrees, relative to the base, such that the feed end is above the discharge end of the top screen deck, the middle screen deck is angled approximately 0.5 degrees, relative to the base, such that an end of the middle screen deck opposite the discharge end of the middle screen deck is above the discharge end of the middle screen deck, and the bottom screen deck is generally parallel to the base.

6. The screen unit of claim 1, wherein a predetermined screen deck area adjacent the discharge end of each of the middle and bottom screen decks is pivotable a predetermined number of degrees from an in-line position to vary the rate of material flow across that deck from the feed end to the discharge end.

7. The screen unit of claim 6, wherein the predetermined number of degrees is approximately three degrees.

8. The screen unit of claim 1, wherein the treatment unit includes a trough in one of the three screen decks and a spray bar positioned relative to the trough so that water from the spray basis directed into the trough to immerse the dredged material in churning water to help clean the material.

9. The screen unit of claim 8, wherein the frame includes first and second walls and the decks are positioned between the walls, and further wherein troughs are in all three decks extending between the first and second walls and spray bars are positioned to lie generally above the troughs in each deck.

10. The screen unit of claim 8, wherein the trough is a separate unit placed between sections of the screen deck.

11. The screen unit of claim 8, wherein the trough is integral with the screen deck.

12. The screen unit of claim 1, wherein the treatment unit is adjacent the feed end of the top screen deck.

13. The screen unit of claim 1, wherein the screen unit includes a shaft counterweight that produces a first centrifugal force when rotated so that the screen unit vibrates with a first amplitude, and further comprising a reversible counterweight coupled to the shaft counterweight so that when the shaft counterweight and the reversible counterweight rotate in a first direction, the mass of the shaft counterweight and the reversible counterweight add to produce a second centrifugal force greater than the first centrifugal force so that the screen unit vibrates with a second amplitude larger than the first amplitude and when the shaft counterweight and reversible counterweight rotate in a second direction, the mass of the shaft counterweight and the reversible counterweight subtract to produce a third centrifugal force less than the first centrifugal force so that the screen unit vibrates with a third amplitude less than the first amplitude.

14. The screen unit of claim 1, further comprising a dam coupled to the top screen deck adjacent the feed end of the top screen deck to cause a build-up of material on the top screen deck adjacent the dam thereby increasing the quantities of water and material below the first mesh size that are directed to the splitter and middle screen deck.

15. The screen unit of claim 1, further comprising a plate coupled to the discharge end of at least one of the screen decks and configured to be movable between a first position to block material flow, thereby causing a build-up of material adjacent the plate to increase the quantities of material below the mesh size of the deck and water that pass through the deck and a second position to allow material to flow past the plate without build-up.

16. A screen unit for dewatering material under clean and unclean conditions, comprising:

a frame having a width;

top screen means coupled to the frame for separating material below a first size from material above the first size so that material above the first size is discharged from the top screen means at a discharge end of the top screen means, the top screen means having a feed end that receives material;

middle screen means coupled to the frame below the top screen means for separating material below a second size which is smaller than the first size from material above the second size so that material above the second size is discharged from the middle screen means at a discharge end of the middle screen means;

bottom screen means coupled to the frame below the middle screen means for separating below a third size which is smaller than the first size from material above the third size so that material above the third size is discharged from the bottom screen means at a discharge end of the middle screen means;

splitter means positioned to lie below the top screen means for dividing the quantity of material that is processed by the middle and bottom screen means, said splitter means extending continuously across the width of said frame and comprising alternating closed channels and screen rows which alternate across the width of the frame; and water treatment means coupled to at least one of the screen means for immersing the material in churning water to clean the material during unclean material conditions.

17. The screen unit of claim 16, wherein the top, middle, and bottom screen means include a plurality of screen decks each having predetermined first, second and third mesh size openings respectively.

18. The screen unit of claim 17, wherein the second and third mesh size openings are substantially equal.

19. The screen unit of claim 16, wherein the splitter means is positioned to lie below the feed end of the top screen means.

20. The screen unit of claim 16, wherein the water treatment means includes a trough in one of the three screen means and a spray bar positioned relative to the trough so that water from the spray bar is directed into the trough.

21. The screen unit of claim 20, wherein the frame includes first and second walls and the screen means are each between the walls, and further wherein the troughs are in all three screen means extending between the first and second walls and spray bars are positioned to lie generally above the troughs.

22. The screen unit of claim 16, wherein the water treatment means is adjacent the feed end of the top screen means.

23. The screen unit of claim 16, further comprising dam means coupled to the top screen means adjacent the feed end of the top screen means for compressing material on the top screen means adjacent the dam means thereby increasing the quantities of material below the first size and water that are directed to the middle screen means and splitter means.

24. The screen unit of claim 23, wherein the dam means includes a plate coupled generally perpendicularly to the top screen means and substantially transverse to material flow on the top screen means.

25. The screen unit of claim 16, further comprising means positioned to lie below the middle screen means and above the bottom screen means for carrying away water and material that passes through the middle screen means.

26. The screen unit of claim 16, further comprising reversible counterweight means coupled to the screen unit for vibrating the screen unit at a first amplitude when the reversible counterweight is rotated in a first direction during clean material conditions and vibrating the unit at a second amplitude greater than the first amplitude when the reversible counterweight is rotated in a second direction during unclean material conditions to increase stratification of material on the top, middle, and bottom screen means so that a greater quantity of material below the first, second, and third sizes is forced through the respective screen means.

27. The screen unit of claim 26, wherein the reversible counterweight means includes a reversible counterweight coupled to a shaft counterweight of the screen unit so that when the reversible and shaft counterweights are rotated in the first direction, a first centrifugal force is created and when the counterweights are rotated in the second direction, a second centrifugal force is created that is greater than the first centrifugal force.

28. The screen unit of claim 16, further comprising means for adjusting the inclination of the top, middle, and bottom screen means by the same amount so that the flow rate of material is changed.

29. The screen unit of claim 28, wherein the frame includes four corners, one pair positioned to lie below an end of the screen unit into which material is introduced and another pair positioned to lie below an end of the screen unit from which substantially dewatered material exits, and further wherein the inclination adjustment means includes a plurality of incline adjustment pads that are placed under the frame adjacent one of or both pairs of the corners.

30. A screen unit for dewatering material under clean and unclean material conditions, comprising:

a frame having a width;

a first screen deck coupled to the frame and having a first mesh size, a feed end to receive material and a discharge end that discharges substantially dewatered material of a size above the first mesh size;

a second screen deck coupled to the frame below the first screen deck and having a second mesh size and a discharge end that discharges substantially dewatered material of a size above the second mesh size;

a splitter positioned to lie adjacent the feed end of the first screen deck for dividing flow of material between the first and second screen decks, said splitter extending continuously across the width of said frame and comprising alternating closed channels and screen rows which alternate across line width of the frame; and a water treatment unit coupled to the frame and at least one of the two decks that cleans the material during unclean material conditions.

31. The screen unit of claim 30, wherein the first and second mesh sizes are substantially equal.

32. The screen unit of claim 30, further comprising a pan positioned to lie below the first screen deck and above the second screen deck to carry away water and material that passes through the first screen deck.

33. The screen unit of claim 30, wherein the treatment unit is adjacent the feed end of the first screen deck.

34. A screen unit for dewatering material under clean and unclean conditions, comprising:

a frame having a width;

fruit screen means coupled to the frame for separating water and material below a first size from material above the first size so that material above the first size is discharged from the top screen means at a discharge end of the top screen means, the top screen means having a feed end that receives dredged material;

a second screen means coupled to the frame below the first screen means for separating water and material below a second size from material above the second size so that material above the second size is discharged from the second screen means at a discharge end of the second screen means;

splitter means adjacent the feed end of the first screen means for dividing the quantity of material that is processed by the first and second screen means, said splitter extending continuously across the width of said frame and comprising alternating closed channels and screen rows which alternate across the width of the frame; and water treatment means coupled to at least one of the screen means for immersing the material in churning water to clean the material during unclean material conditions.

35. The vibrating screen unit of claim 34, wherein the first and second sizes are substantially equal.

36. The screen unit of claim 34, further comprising means positioned to lie below the first screen means and above the second screen means for carrying away water and material that passes through the first screen means.

37. The screen unit of claim 34, wherein the water treatment means is adjacent the feed end of the first screen means.

38. A screen unit for dewatering material under clean and unclean conditions, comprising:

a frame;

a top screen deck coupled to the frame and having a first mesh size, a feed end to receive material, and a discharge end that discharges substantially dewatered material of a size above the first mesh size;

a middle screen deck coupled to the frame below the top screen deck and having a second mesh size and a discharge end that discharges substantially dewatered material of a size above the second mesh size;

a bottom screen deck coupled to the frame below the middle screen deck and having a third mesh size and a discharge end that discharges substantially dewatered material of a size above the third mesh size;

a splitter positioned to lie below the top screen for dividing flow of material below the first mesh size between the middle and bottom screen decks;

a water treatment unit coupled to the frame and at least one of the three decks that cleans the material during unclean material conditions and;

a trough in one of the three screen decks and a spray bar positioned relative to the trough for directing water from the spray bar into the trough to immerse the material in churning water to help clean the material.

39. The screen unit of claim 38, wherein the frame includes first and second walls and the decks are positioned between the walls, and further wherein troughs are in all three decks extending between the first and second walls and spray bars are positioned to lie generally above the troughs in each deck.

40. The screen unit of claim 38, wherein the trough is a separate unit placed between sections of the screen deck.

41. The screen unit of claim 38, wherein the trough is integral with the screen deck.

42. A screen unit for dewatering material under clean and unclean conditions, comprising:

a frame;

top screen means coupled to the frame for separating material below a first size from material above the first size so that material above the first size is discharged from the top screen means at a discharge end of the top screen means, the top screen means having a feed end that receives material;

middle screen means coupled to the frame below the top screen means for separating material below a second size which is smaller than the first size from material above the second size so that material above the second size is discharged from the middle screen means at a discharge end of the middle screen means;

bottom screen means coupled to the frame below the middle screen means for separating below a third size which is smaller than the first size from material above the third size so that material above the third size is discharged from the bottom screen means at a discharge end of the middle screen means;

splitter means positioned to lie below the top screen means for dividing the quantity of material that is processed by the middle and bottom screen means;

water treatment means coupled to at least one of the screen means for immersing the material in churning water to clean the material during unclean material conditions; and a trough in one of the three screen means and a spray bar positioned relative to the trough for directing water from the spray bar into the trough.

43. The screen unit of claim 42, wherein the frame includes first and second walls and the screen means are each between the walls, and further wherein the troughs are in all three screen means extending between the first and second walls and spray bars are positioned to lie generally above the troughs.

* * * * *